(12) United States Patent
Chen et al.

(10) Patent No.: US 11,742,542 B2
(45) Date of Patent: Aug. 29, 2023

(54) EXPLOSION-PROOF ENCLOSURE FOR ENERGY STORAGE DEVICE AND ENERGY STORAGE DEVICE

(71) Applicant: ChangZhou Microbat Technology Co. Ltd., Jiangsu (CN)

(72) Inventors: Guo Chen, Jiangsu (CN); Jiawen Luo, Jiangsu (CN); Yunfeng Xue, Jiangsu (CN)

(73) Assignee: CHANGZHOU MICROBAT TECHNOLOGY CO. LTD., Jiangsu (CN)

( * ) Notice: Subject to any disclaimer, the term of this patent is extended or adjusted under 35 U.S.C. 154(b) by 178 days.

(21) Appl. No.: 16/972,675

(22) PCT Filed: Apr. 17, 2019

(86) PCT No.: PCT/CN2019/082962
§ 371 (c)(1),
(2) Date: Dec. 7, 2020

(87) PCT Pub. No.: WO2020/199249
PCT Pub. Date: Oct. 8, 2020

(65) Prior Publication Data
US 2021/0249720 A1  Aug. 12, 2021

(30) Foreign Application Priority Data

Apr. 2, 2019 (CN) .......................... 201910263232.9
Apr. 2, 2019 (CN) .......................... 201920441653.1

(51) Int. Cl.
*H01M 50/143* (2021.01)
*H01M 50/157* (2021.01)
*H01M 50/183* (2021.01)

(52) U.S. Cl.
CPC ....... *H01M 50/143* (2021.01); *H01M 50/157* (2021.01); *H01M 50/183* (2021.01)

(58) Field of Classification Search
CPC ............. H01M 50/143; H01M 50/157; H01M 50/183; H01M 50/3425; H01M 10/0525;
(Continued)

(56) References Cited

U.S. PATENT DOCUMENTS

| 5,128,218 A * | 7/1992 | Tokunaga ............. H01M 4/685 |
| | | 429/57 |
| 2011/0123845 A1* | 5/2011 | Kusama ............ H01M 50/3425 |
| | | 429/61 |

(Continued)

FOREIGN PATENT DOCUMENTS

| CN | 103035863 A | * 4/2013 |
| CN | 103035863 A | 4/2013 |

(Continued)

OTHER PUBLICATIONS

Lubing, Unlocking the significant role of shell material for lithium-ion battery safety, Elsevier, Aug. 5, 2018, 3.1.1 (Year: 2018).*

*Primary Examiner* — Niki Bakhtiari
*Assistant Examiner* — Bartholomew A Hornsby
(74) *Attorney, Agent, or Firm* — SALIWANCHIK, LLOYD & EISENSCHENK (57) ABSTRACT

The present disclosure discloses an explosion-proof enclosure for an energy storage device and an energy storage device. The explosion-proof enclosure includes: a housing body, having a through hole; and an explosion-proof element, including a central portion and a pressure relief portion provided around the central portion, wherein the pressure relief portion is loop-shaped, the pressure relief portion is provided in the through hole and is in sealed connection with the through hole, the pressure relief portion is configured to crack and split from the housing body in
(Continued)

response to the deformation of the housing body when the pressure intensity in the housing body reaches a first set value, and to detach from the housing body when the pressure intensity reaches a second set value, wherein the second set value is greater than the first set value.

19 Claims, 4 Drawing Sheets

(58) Field of Classification Search
CPC ......... H01M 2200/20; H01M 10/6561; H01M 50/30; H01M 50/308; H01M 50/325; H01M 50/35; H01M 50/358; H01M 50/367; H01M 50/375; H01G 11/80; H01G 9/12; Y02E 60/10
See application file for complete search history.

(56) References Cited

U.S. PATENT DOCUMENTS

| | | | | |
|---|---|---|---|---|
| 2013/0196188 | A1* | 8/2013 | Sode | H01M 50/3425 |
| | | | | 72/379.4 |
| 2014/0227565 | A1* | 8/2014 | Wan | H01M 50/308 |
| | | | | 429/56 |
| 2017/0110706 | A1* | 4/2017 | Gong | H01M 50/543 |
| 2017/0141370 | A1* | 5/2017 | Uchida | H01M 50/171 |

FOREIGN PATENT DOCUMENTS

| | | | | |
|---|---|---|---|---|
| CN | 106025148 A | * | 10/2016 | ......... H01M 2/1264 |
| CN | 106025148 A | | 10/2016 | |
| CN | 208230604 U | | 12/2018 | |

* cited by examiner

EXPLOSION-PROOF ENCLOSURE FOR ENERGY STORAGE DEVICE AND ENERGY STORAGE DEVICE

CROSS REFERENCE TO RELATED APPLICATIONS

This application is a National Stage of International Application No. PCT/CN2019/082962, filed on Apr. 17, 2019, which claims priority to Chinese Patent Application No. 201910263232.9, filed on Apr. 2, 2019, and Chinese Patent Application No. 201920441653.1, filed on Apr. 2, 2019; all of which are hereby incorporated by reference in their entireties.

TECHNICAL FIELD

The present disclosure relates to the field of energy conversion technology, and more particularly to an explosion-proof enclosure for an energy storage device and an energy storage device.

BACKGROUND

For most existing energy storage devices including typical electrolytic capacitors, primary batteries, and secondary batteries such as hard-shell lithium-ion batteries and nickel-metal hydride batteries, in order to avoid explosion due to internal pressure rise caused by internal thermal runaway in the case of internal manufacturing defects or user abuse, there is typically provided an explosion-proof pressure relief mechanism to ensure that these energy storage devices can be subjected to pressure relief timely whenever internal gas pressure rises excessively during long-term use or during thermal runaway, thereby ensuring personal and property safety.

Commonly used explosion-proof pressure relief structures include the following two categories.

(1) Diaphragm Type Explosion-Proof Pressure Relief Structures

Such pressure relief structures generally utilize materials with low ultimate strength, where the materials are reduced in thickness to form diaphragms. The diaphragms undergo deformation when internal pressure rises, and burst by itself or by a piercing mechanism when the deformation reaches a certain degree, so as to achieve the purpose of pressure relief. Since the diaphragms are generally of relatively soft and thin materials, in order to prevent unexpected damage thereto which may cause failure of the energy storage device, on an upper cover and a lower cover thereof there is usually provided a protection mechanism, a clamping or riveting mechanism, and sometimes even a piercing mechanism. This results in a complicated structure with a large number of particles which is difficult to assemble, has an excessive height and takes up a large space.

(2) Engraved Explosion-Proof Pressure Relief Structure

For such a pressure relief structure, there is typically formed a notch groove on a surface of a housing of the structure by thinning the housing material at the notch groove and reducing strength thereof, and pressure relieving is achieved by releasing gas from the relatively weak notch groove when internal pressure of the energy storage device rises to a design value. Such a pressure relief structure is quite demanding on machining accuracy of the notch groove, and only metals with a relatively low hardness and better ductility, for example aluminum alloy are suitable for machining the notch groove. Meanwhile, under the premise of ensuring a lower burst pressure, it is difficult to perform reliable machining of the notch groove with carbon steel, stainless steel or other alloys with higher hardness. What is more, because of the low strength of the notch groove, failure of the energy storage device often occurs due to unexpected damage to an explosion-proof valve during manufacture or use.

Therefore, it is necessary to provide a new technical solution to solve the above technical problems.

SUMMARY

An objective of the present disclosure is to provide a novel technical solution of an explosion-proof enclosure for an energy storage device.

According to a first aspect of the present disclosure, there is provided an explosion-proof enclosure for an energy storage device. The explosion-proof enclosure includes: a housing body, having a through hole; and an explosion-proof element, including a central portion and a pressure relief portion provided around the central portion, wherein the pressure relief portion is loop-shaped, the pressure relief portion is provided in the through hole and in sealed connection with the through hole, the pressure relief portion is configured to crack and split from the housing body in response to deformation of the housing body when a pressure intensity in the housing body reaches a first set value and to detach from the housing body when the pressure intensity reaches a second set value greater than the first set value.

Optionally, the housing body and the central portion are made of conductors, and the housing body and the central portion serve as two electrodes of an energy storage device respectively.

Optionally, the size of the pressure relief portion along the radial direction is defined as a width, the size along the axial direction is defined as a height, and a ratio of the width to the height is greater than or equal to 0.5.

Optionally, the pressure relief portion is ring-shaped, the size of the pressure relief portion along the axial direction is defined as a height, and a ratio of the diameter of an outer ring to the height of the pressure relief portion is greater than or equal to 1.

Optionally, the pressure relief portion is rectangular loop-shaped, the size of the pressure relief portion along the axial direction is defined as a height, and a ratio of the length of a diagonal line to the height of the pressure relief portion is greater than or equal to 1.

Optionally, the pressure relief portion is elliptical loop-shaped, the size of the pressure relief portion along the axial direction is defined as a height, and a ratio of the size of a long axis to the height of the pressure relief portion is greater than or equal to 1.

Optionally, the through hole extends to form a cylindrical body, and the pressure relief portion is located inside the cylindrical body.

Optionally, a portion of the cylindrical body connected to the housing body is defined as a root portion, and an outer chamfer is formed on the outer side of the root portion.

Optionally, a portion of the cylindrical body connected to the housing body is defined as a root portion, an inner chamfer is formed on the inner side of the root portion, and the pressure relief portion is filled in a region confined by the inner chamfer.

Optionally, the housing body includes a cover plate located on the end portion, and the through hole is provided in the cover plate.

Optionally, a thickness of the cover plate is 0.1 mm to 1 mm.

Optionally, the housing body forms a cavity, wherein the cover plate includes an inner surface close to the cavity and an outer surface opposite to the inner surface, both the inner surface and the outer surface are planes; and the explosion-proof element includes a lower end surface close to the cavity and an upper end surface opposite to the lower end surface, the lower end surface is flush with the inner surface, and the upper end surface is flush with the outer surface.

Optionally, the size of the pressure relief portion along the radial direction is defined as a width, the size along the axial direction is defined as a height, wherein the width is 0.1 mm to 5 mm, and the height is 0.2 mm to 5 mm.

Optionally, the central portion includes a first end surface close to the cavity and a second end surface opposite to the first end surface, wherein the first end surface and/or the second end surface extends radially to form an extension, and the extension at least partially covers the pressure relief portion.

Optionally, the surface of the housing body is recessed to form a strip-shaped groove, wherein the extension line of the groove passes through the explosion-proof element.

Optionally, a plurality of the grooves is provided, and the plurality of grooves is radial with the center of the explosion-proof element as a center.

Optionally, the pressure relief portion is made of an inorganic nonmetal material.

Optionally, the material of the pressure relief portion is glass or ceramic.

Optionally, the material of the portion of the housing body which is hermetically connected to the pressure relief portion is tantalum, niobium, molybdenum, tungsten, titanium, platinum, copper, aluminum, carbon steel, kovar or stainless steel.

Optionally, the coefficient of thermal expansion of the central portion is equal to the coefficient of thermal expansion of the pressure relief portion, and the coefficient of thermal expansion of the housing body is greater than or equal to the coefficient of thermal expansion of the pressure relief portion.

According to another embodiment of the present disclosure, there is provided an energy storage device. The energy storage device includes an energy conversion element and the above explosion-proof enclosure.

Optionally, the energy storage device is a battery or a capacitor.

According to one embodiment of the present disclosure, when the pressure relief portion cracks and splits, gas inside the explosion-proof enclosure can be released through the pressure relief passage formed of cracks and splits. When the pressure relief portion detaches, the gas inside the explosion-proof enclosure is quickly released through the through hole.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of the description, illustrate embodiments of the present disclosure and, together with the description thereof, serve to explain the principles of the present disclosure.

REFERENCE SIGNS

11: cover plate; 12: pressure relief portion; 13: central portion; 14: groove; 21: first extension; 22: second extension; 23: energy conversion element; 24: sidewall; 25: bottom.

DETAILED DESCRIPTION

Various exemplary embodiments of the present disclosure will now be described in detail with reference to the accompanying drawings. It should be noted that the relative arrangement, numerical expressions and numerical values of the components and steps set forth in these examples do not limit the scope of the disclosure unless otherwise specified.

The following description of at least one exemplary embodiment is in fact merely illustrative and is in no way intended as a limitation to the present disclosure and its application or use.

Techniques, methods, and apparatus known to those of ordinary skill in the relevant art may not be discussed in detail but where appropriate, the techniques, methods, and apparatus should be considered as part of the description.

Among all the examples shown and discussed herein, any specific value should be construed as merely illustrative and not as a limitation. Thus, other examples of exemplary embodiments may have different values.

It should be noted that similar reference numerals and letters denote similar items in the accompanying drawings, and therefore, once an item is defined in a drawing, and there is no need for further discussion in the subsequent accompanying drawings.

Figure 1:
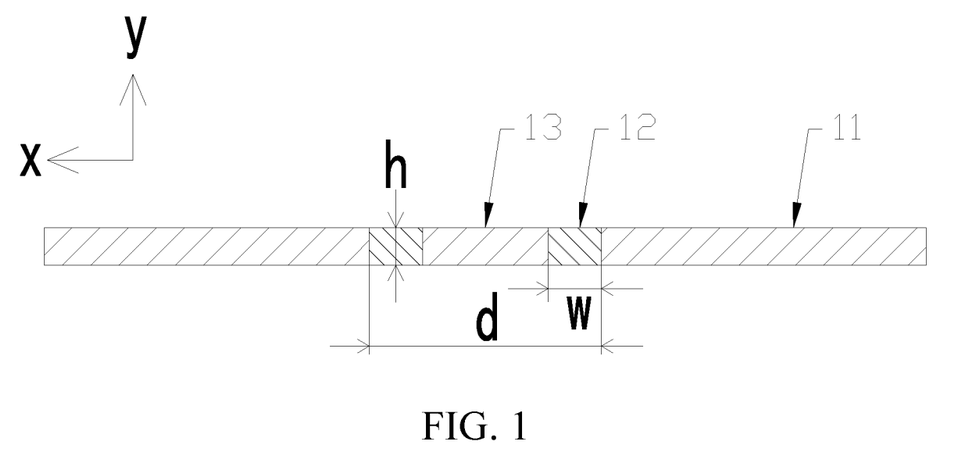
FIG. 1 is a cross-sectional view of a portion of an explosion-proof enclosure according to an embodiment of the present disclosure.

According to an embodiment of the present disclosure, there is provided an explosion-proof enclosure for an energy storage device. As shown in FIG. 1, the explosion-proof enclosure includes a housing body and an explosion-proof element. The housing body has a cylindrical shape, an elliptical cylindrical shape, a rectangular parallelepiped shape and the like. The housing body includes a top, a bottom 25 and a sidewall 24 located between the top and the bottom 25.

For example, a cover plate 11 is provided at the top. The bottom 25 and the sidewall 24 are integrally formed. Alternatively, the top and the bottom 25 are both provided with the cover plate 11. The cover plate 11 is welded to the sidewall 24 by laser welding or electric resistance welding.

The housing body forms therein a cavity. The cavity is configured to accommodate the energy conversion element 23.

The through hole communicates with the cavity and an external space. The shape of the through hole is circular, elliptical, rectangular or other shapes.

The explosion-proof element includes a central portion 13 and a pressure relief portion 12 provided around the central portion 13. The pressure relief portion 12 has a loop shape, such as a ring shape, a rectangular loop shape and an elliptical loop shape. The pressure relief portion 12 is provided within the through hole and forms sealing connection with the through hole. The central portion 13 is connected in the through hole by the pressure relief portion 12 in a sealed manner.

For example, the through hole is located in the cover plate 11 or the sidewall 24. One or a plurality of through holes may be provided, and accordingly, one or a plurality of explosion-proof elements is provided.

The pressure relief portion 12 is configured to crack and split from the housing body in response to deformation of the housing body when the pressure intensity in the housing body reaches a first set value and to detach from the housing body when the pressure intensity reaches a second set value greater than the first set value.

When the pressure relief portion 12 cracks and splits, gas inside the explosion-proof enclosure can be released through the pressure relief passage formed through crack and split. When the pressure relief portion 12 detaches, the gas in the explosion-proof enclosure is quickly released through the through hole.

For example, when the gas pressure inside the energy storage device rises, the lower surface of the housing body is bent and deformed by the gas pressure. The degree of deformation depends on the applied gas pressure. The larger the gas pressure is, the larger the amount of deformation is, and the smaller the gas pressure is, the smaller the amount of deformation is. At this point, the pressure relief portion 12 and the central portion 13 move in parallel according to the deformation of the housing body. Since the amount of deformation allowed by the pressure relief portion 12 per se is very small, stress concentration is generated at the joint between the housing body and the pressure relief portion 12. Therefore, the upper half portion of the connecting interface between the pressure relief portion 12 and the housing body is radially stretched, while the lower half portion of the connecting interface is radially compressed.

As the gas pressure of the housing body rises, the amount of deformation of the housing body gradually increases, and the radial stretching effect on the connecting interface between the pressure relief portion 12 and the housing body is gradually increased. When the pressure intensity reaches the first set value, the stretching stress of the upper half portion is greater than the connecting strength of the connecting interface, and the connecting interface begins to crack. The compressive stress of the lower half portion is greater than the compressive strength of the pressure relief portion 12, and the pressure relief portion 12 splits by itself. A pressure relief passage is formed when cracks in the upper half portion is in fluid communication with the splits in the lower half portion, and airtightness of the sealing connection between the pressure relief portion 12 and the housing body begins to degrade. The high-pressure gas inside the energy storage device is discharged to the outside through the pressure relief passage.

As the gas pressure applied to the housing body continues to increase, the cracks of the connecting interface between the pressure relief portion 12 and the housing body and the slits of the pressure relief portion 12 per se continuously increase. When the connecting strength between the pressure relief portion 12 and the housing body is insufficient to support the internal gas pressure (i.e., the pressure intensity reaches the second set value), the pressure relief portion 12 and the central portion 13 are pushed out by the gas pressure. In this way, the housing body forms a quick gas exhaust passage for rapid pressure relief, thereby effectively preventing the energy storage device from exploding.

For example, the pressure relief portion 12 and the central portion 13 may detach together, or the pressure relief portion 12 may partially detach.

A person skilled in the art can adjust the first set value and the second set value by setting the thickness of the housing body, the material strength of the housing body, the width and height of the pressure relief portion 12, and the like, so as to meet the pressure relief requirements of the energy storage devices of different models.

In addition, the structure of the explosion-proof element is simple, the space occupied in the axial direction is small, and the saved space can be used to increase the number of the energy conversion elements 23.

In addition, the explosion-proof enclosure is subjected to pressure relief by means of the breaking limit of the material per se, and has the characteristic of high pressure relief accuracy.

In addition, the explosion-proof enclosure has better appearance.

In other examples, the cracks and the splits may also respectively extend along the axial direction to form the pressure relief passage. In this way, the function of pressure relief can also be achieved.

In one example, the pressure relief portion 12 is made of an insulating material, which is, for example, an inorganic nonmetallic material. The material has the characteristics of small toughness, large brittleness, and easy formation of the slits, so that the pressure can be released in time when the internal pressure of the housing body reaches the set value.

In one example, the pressure relief portion 12 is made of glass or ceramic. During manufacturing, a glass or ceramic blank is placed in the through hole. The central portion 13 is embedded in the blank. The blank is then pre-fired to obtain a structural strength and the pressure relief portion 12 is enabled to form sealing connection (i.e., hermetic connection) with the through hole and the central portion 13.

For example, when the glass material is used, the pressure relief portion 12 is glass ceramic, borosilicate glass, phosphate glass or other special glass. The glass may form a solid structure, a hollow structure or a pierced structure as long as the pressure relief requirement is met.

The central portion 13 and the housing body are made of conductors. The central portion 13 and the housing body serve as two electrodes of the energy storage device respectively. For example, the central portion 13 is connected to the positive electrode of the energy conversion element 23. The housing body is connected to the negative electrode of the energy conversion element 23.

Or, the central portion 13 is connected to the negative electrode of the energy conversion element 23, and the housing body is connected to the positive electrode of the energy conversion element 23.

In one example, the size of the pressure relief portion 12 along the radial direction is defined as the width, and the size along the axial direction is defines as the height. The ratio of the width to the height is greater than or equal to 0.5. The radial direction is as shown by the x arrow in FIG. 1, and the axial direction is as shown by the y arrow in FIG. 1. The width is as shown by w in FIG. 1, and the height is as shown by h in FIG. 1.

The larger the width is, the larger the gas pressure applied to the pressure relief portion 12 is, and the smaller the pressure intensity for pressure relief (i.e., the first set value and the second set value) is. Conversely, the smaller the width is, the smaller the pressure intensity for pressure relief is. The higher the height is, the higher the structural strength of the pressure relief portion 12 is, and the greater the pressure intensity for pressure relief is. Conversely, the smaller the height is, the smaller the pressure intensity for pressure relief is. Within such ratio range, the pressure intensity for pressure relief is moderate.

In one example, the size of the pressure relief portion 12 along the axial direction is defined as the height, and the ratio of the diameter of an outer ring (as shown by d in the figure) to the height of the pressure relief portion 12 is greater than or equal to 1. The larger the diameter of the outer ring is, the lower the structural strength of the pressure relief portion 12 is, and the smaller the pressure intensity for pressure relief (i.e., the first set value and the second set value) is. Conversely, the smaller the diameter of the outer ring is, the larger the pressure intensity for pressure relief is. The higher the height is, the higher the structural strength of the pressure relief portion 12 is, and the greater the pressure intensity for pressure relief is. Conversely, the smaller the height is, the smaller the pressure intensity for pressure relief is. Within such ratio range, the pressure intensity for pressure relief is moderate.

In one example, the pressure relief portion has a rectangular loop shape. The size of the pressure relief portion along the axial direction is defined as the height, and the ratio of the length of a diagonal line to the height of the pressure relief portion is greater than or equal to 1. Within such ratio range, the pressure intensity for pressure relief is moderate.

In one example, the pressure relief portion has an elliptical loop shape. The size of the pressure relief portion along the axial direction is defined as the height, and the ratio of the size of a long axis to the height of the pressure relief portion is greater than or equal to 1. Within such ratio range, the pressure intensity for pressure relief is moderate.

Figure 7:
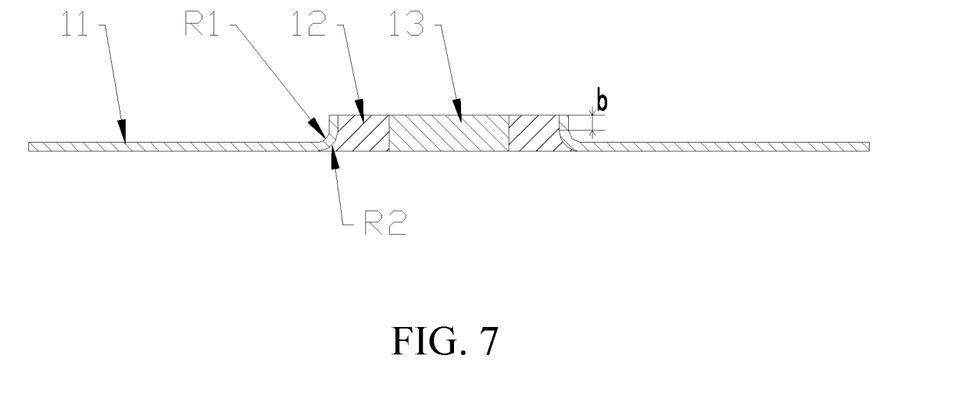
FIG. 7 is a cross-sectional view of a portion of a fifth explosion-proof enclosure according to an embodiment of the present disclosure.

In one example, as shown in FIG. 7, the through holes extend to form a cylindrical body. For example, the housing body extends to one side or both sides along the thickness direction at the through hole to form the cylindrical body. The cylindrical body is integrally formed with the housing body.

The pressure relief portion 12 is located inside the cylindrical body. The contact area between the cylindrical body and the pressure relief portion 12 is larger, so that the connecting strength between the pressure relief portion 12 and the through hole is higher. In this way, the thicknesses of other parts of the housing body can be effectively reduced. Under the condition that the pressure intensity for pressure relief is constant, the housing body can be made thinner, thereby conforming to the development trend of miniaturization, lightening and thinning of the energy storage device.

In addition, the thickness of the housing body is reduced, and relatively large deformation can be generated under a relatively small internal pressure intensity, thereby enabling the pressure intensity for pressure relief of the energy storage device to be smaller and the safety performance to be better.

Of course, in other examples, if the thickness of the housing body is sufficient, then at this time, only the pressure relief portion 12 is required to be filled in the through hole without the need to provide the cylindrical body.

The portion of the cylindrical body connected to the housing body is defined as a root portion. When the root portion is closer to a right angle, stress concentration is easier to form at the root portion. The deformation of the housing body generates a relatively large stress at the root portion, causing the plastic deformation of the root portion. Thus, the deformation of the housing body does not cause the lateral movement of the cylindrical body. That is, the deformation of the housing body cannot be transmitted to the cylindrical body, the cylindrical body does not extrude or stretch the pressure relief portion 12, and the cracks and splits are not formed. The valve opening pressure of the explosion-proof element of the energy storage device is increased.

In order to solve the technical problem, in one example, an outer chamfer is formed on the outer side of the root portion of the cylindrical body (as shown by R1 in FIG. 7). The outer chamfer can effectively reduce the stress concentration generated at the root portion, so that the deformation of the housing body can be quickly transmitted to the cylindrical body. Thus, the upper half portion of the cylindrical body extrudes the pressure relief portion 12, and the lower half portion stretches the pressure relief portion 12, thereby forming the pressure relief passage more easily.

In addition, when the height of the pressure relief portion 12 is too low, the strength is low, and the pressure relief portion 12 is easily broken, for example, may be damaged during processing, transporting and using, thereby losing the effect of the insulating sealing.

In one example, an inner chamfer (as shown by R2 in FIG. 7) is formed on the inner side of the root portion of the cylindrical body. The pressure relief portion 12 is filled in the region confined by the inner chamfer. The pressure relief portion 12 includes a straight section (as shown by b in FIG. 7) and a curved section. Effective sealing connection is formed between the straight section and the cylindrical body.

The effective height of the pressure relief portion 12, i.e., the size of the straight section, determines the pressure intensity for pressure relief. The larger the length of the straight section is, the larger the pressure intensity for pressure relief is. Conversely, the smaller the length of the straight section is, the smaller the pressure intensity for pressure relief is. The portion of the pressure relief portion 12 located in the region confined by the inner chamfer (i.e., the curved section) has little effect on the pressure intensity for pressure relief By providing the inner chamfer, the sealing connection area between the straight section and the cylindrical body can be effectively reduced, and the effective height of the pressure relief portion 12 is reduced.

Thus, even if the overall height of the pressure relief portion 12 is 0.5 mm or more, since the influence of the curved section on the pressure intensity for pressure relief is small, the effective height of the pressure relief portion 12 can reach 0.2 mm, 0.3 mm, 0.4 mm or less. Thus, the explosion-proof element is allowed to have a lower pressure intensity for pressure relief, thereby meeting the use requirements of small energy storage devices, such as needle batteries or button batteries.

Figure 8:
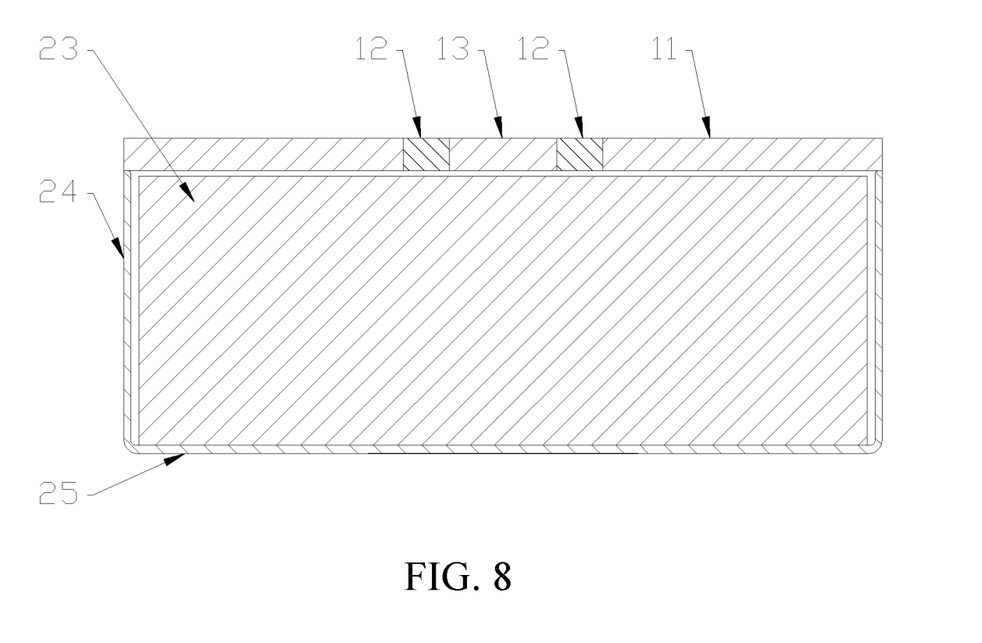
FIG. 8 is a cross-sectional view of an energy storage device according to another embodiment of the present disclosure.

In one example, as shown in FIG. 8, a through hole is provided in the cover plate 11. Compared with the manner that the through hole is formed in the sidewall 24, the cover plate 11 is flatter, the difficulty of forming the through hole is smaller, and the size of the through hole is more precise.

For example, the thickness of the cover plate 11 is 0.1 mm to 1 mm. The cover plate 11 of such size range is easier to deform, so that the energy storage device can be subjected to pressure relief under a lower pressure intensity for pressure relief, and the development trend of lightening and thinning of the energy storage device is satisfied.

In one example, as shown in FIG. 1 and FIG. 8, the cover plate 11 includes an inner surface close to the cavity and an outer surface opposite to the inner surface. The inner and outer surfaces are planes. The explosion-proof element includes a lower end surface close to the cavity and an upper end surface opposite to the lower end surface, where the lower end surface is flush with the inner surface, and the upper end surface is flush with the outer surface. In such example, the whole component assembled by the cover plate 11 and the explosion-proof element is in the form of a sheet. Such structure occupies a small external space and the energy storage device has a high space utilization rate.

In one example, the width of the pressure relief portion 12 is 0.1 mm to 5 mm, and the height of the pressure relief portion 12 is 0.2 mm to 5 mm. Within the range, the explosion-proof element meets the explosion-proof rating requirements of the energy storage element.

Figure 4:
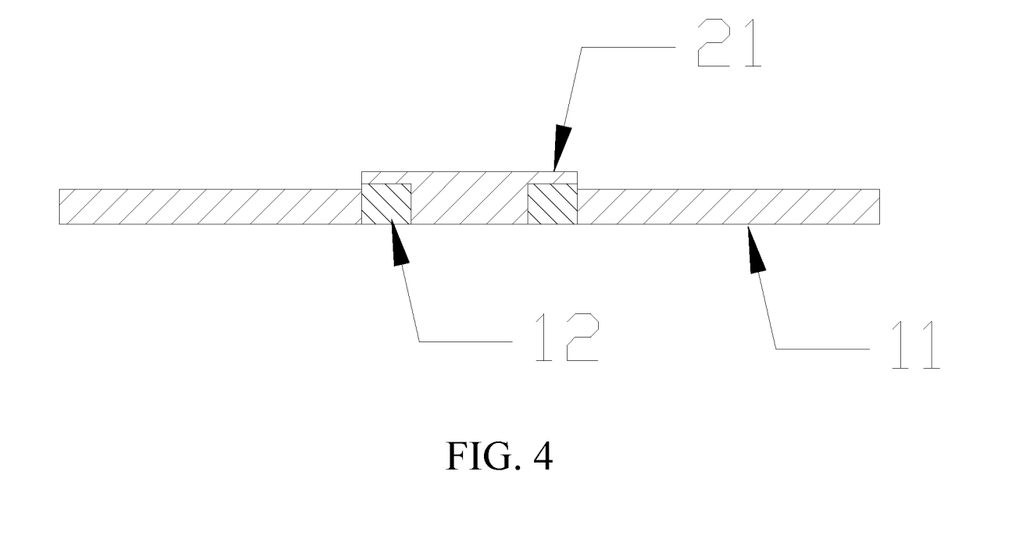
FIG. 4 is a cross-sectional view of a portion of a third explosion-proof enclosure according to an embodiment of the present disclosure.
Figure 5:
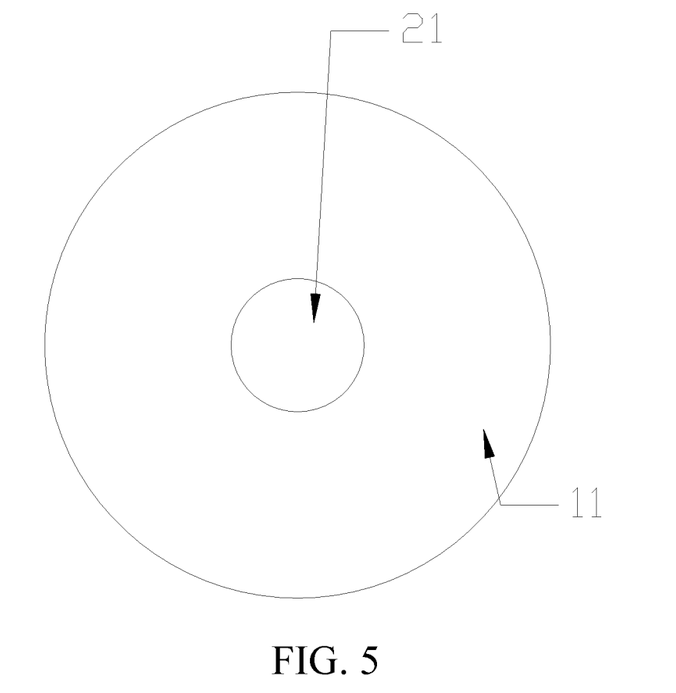
FIG. 5 is a top view of FIG. 4.
Figure 6:
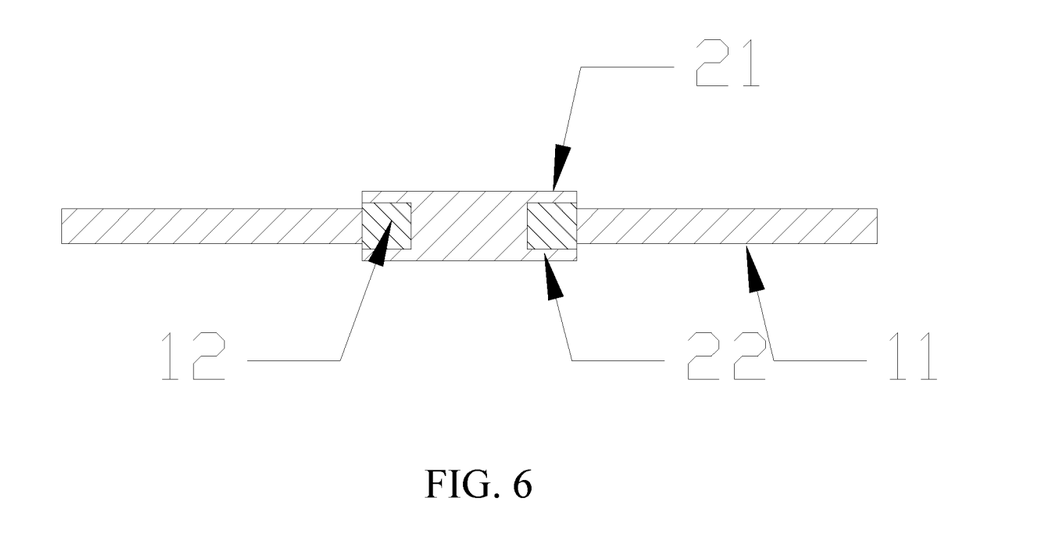
FIG. 6 is a cross-sectional view of a portion of a fourth explosion-proof enclosure according to an embodiment of the present disclosure.

In one example, as shown in FIG. 4 to FIG. 6, the central portion 13 includes a first end surface close to the cavity and a second end surface opposite to the first end surface. The first end surface and/or the second end surface extends radially to form an extension (for example, the first extension 21 and the second extension 22). The extension at least partially covers the pressure relief portion 12.

For example, the material of the central portion 13 is tantalum, niobium, molybdenum, tungsten, titanium, platinum, copper, aluminum, carbon steel, kovar or stainless steel. Due to the high hardness of the above metal, the structural strength of the explosion-proof enclosure is high. The central portion 13 forms a T-shaped structure or an I-shaped structure. The extension can effectively increase the area of the first end surface and/or the second end surface. Due to the increase of the area, the connection between the central portion 13 and other components (for example, a tab or PCM) is facilitated.

In addition, the energy conversion element 23 is usually connected to the central portion 13 by means of the tab. The first extension 21 or the second extension 22 increases the area of the end surface of the central portion 13. Therefore, the tab has a larger contact area with the central portion 13, thereby allowing a larger current to pass, and meeting the large-current charging and discharging use requirements of the energy storage device.

For example, the first extension 21 and/or the second extension 22 integrally cover/s both end surfaces of the pressure relief portion 12 along the axial direction. In this way, the first extension 21 and/or the second extension 22 can protect the pressure relief portion 12. The extension can prevent the pressure relief portion 12 from being collided by an external object.

In one example, the surface (for example, the inner or outer surface) of the housing body is recessed to form a strip-shaped groove 14. The groove 14 is in the shape of a straight line, an arc line, a wavy line or the like. The extension line of the groove 14 passes through the explosion-proof element.

In this example, the housing body with the groove 14 as an axis, which enables deformation of the housing body to be easier. The groove 14 does not break during the deformation of the housing body, and no cracking occurs. By accelerating the deformation of the housing body, cracks of the pressure relief portion 12 and the splits between the pressure relief portion 12 and the housing body quickly occur, such that the required pressure intensity for pressure relief of the explosion-proof element is reduced and the pressure relief requirements of small energy storage devices are met.

Figure 2:
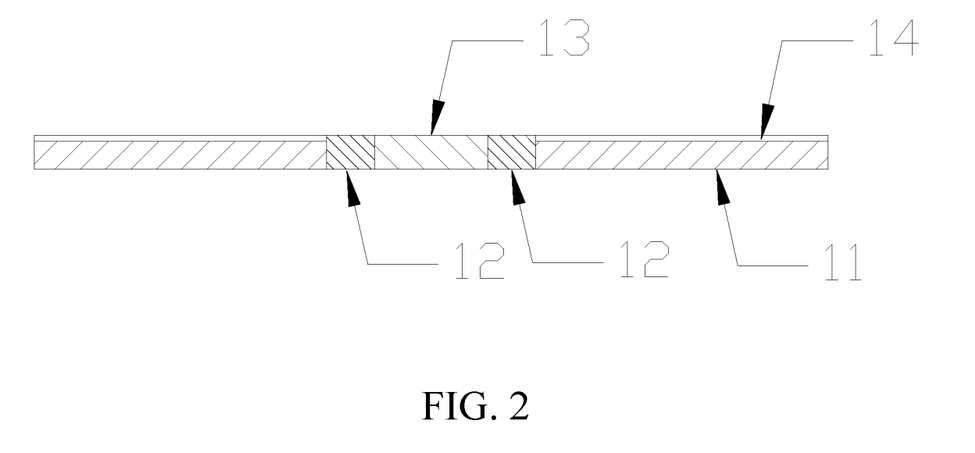
FIG. 2 is a cross-sectional view of a portion of another explosion-proof enclosure according to an embodiment of the present disclosure.
Figure 3:
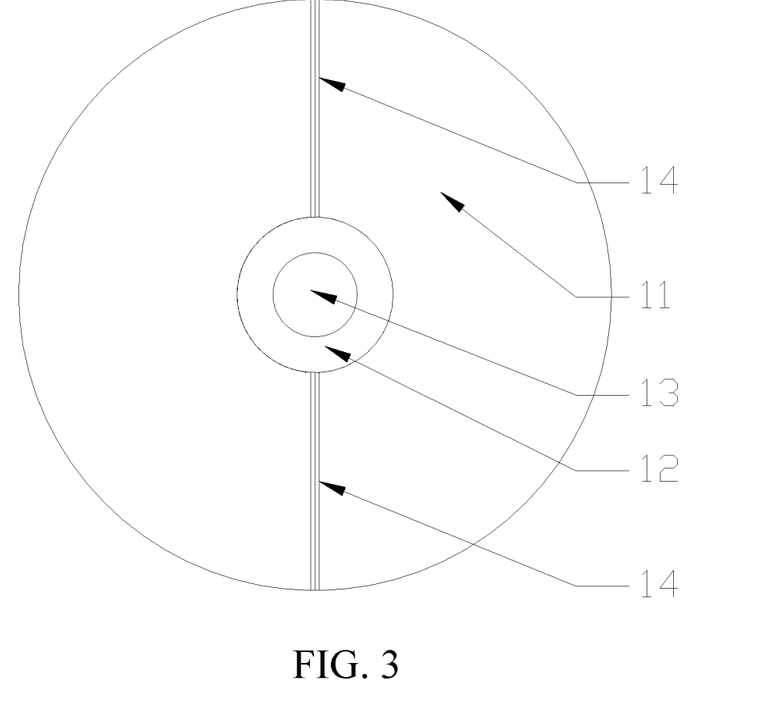
FIG. 3 is a top view of FIG. 2.

In one example, as shown in FIG. 2 and FIG. 3, a plurality of grooves 14 is provided, and the plurality of grooves 14 is radial with the center of the explosion-proof element. By providing the plurality of grooves 14, the pressure intensity for pressure relief of the explosion-proof element can be more effectively reduced.

For example, as shown in FIG. 3, two grooves 14 are provided and pass through the center of the explosion-proof element. During deformation, the structural strength of the grooves 14 is low. The housing body protrudes outwardly at the two grooves 14. The position between the portion of the housing body perpendicular to the grooves 14 and the pressure relief portion 12 features the largest deformation, and in such position, the pressure relief passage is easily formed, so that the internal gas is rapidly released.

In other examples, three, four, five, six or more grooves 14 may be provided.

In one example, a coefficient of thermal expansion of the central portion 13 is equal to the coefficient of thermal expansion of the pressure relief portion 12. Thus, it is ensured that the connection between the central portion 13 and the pressure relief portion 12 is firm and the temperature resistance is better. The explosion-proof element does not undergo large deformation due to the change in ambient temperature. The pressure relief portion 12 does not break due to the expansion of the central portion 13.

The coefficient of thermal expansion of the housing body is greater than or equal to the coefficient of thermal expansion of the pressure relief portion 12. The selection of the coefficients of thermal expansion ensures that good sealing connection is formed between the housing body and the pressure relief portion 12. When the coefficients of thermal expansion of the housing body and the pressure relief portion 12 are equal, the temperature resistance of the explosion-proof enclosure is further improved.

When the coefficient of thermal expansion of the housing body is greater than the coefficient of thermal expansion of the pressure relief portion 12, the sealing strength of the explosion-proof enclosure is higher. Such manner is more suitable for the energy storage devices with higher pressure intensity for pressure relief, for example, the material of the housing body is an iron-based expansion alloy, which includes the models such as 4J28 and 4J29.

According to another embodiment of the present disclosure, there is provided an energy storage device. As shown in FIG. 8, the energy storage device includes an energy conversion element 23 and the above explosion-proof enclosure.

The energy storage device is a battery or a capacitor. For example, batteries include a lithium ion battery, a nickel chrome battery, an alkaline battery, a flow battery, a lead acid battery, and the like, capacitors include an organic dielectric capacitor, an inorganic dielectric capacitor, an electrolytic capacitor, an electric thermal capacitor, an air dielectric capacitor and the like. The energy storage device is featured by excellent safety performance.

While certain specific embodiments of the present disclosure have been illustrated by way of example, it will be understood by those skilled in the art that the foregoing examples are provided for purpose of illustration and are not intended to limit the scope of the present disclosure. It will be understood by those skilled in the art that the foregoing embodiments may be modified without departing from the scope and spirit of the disclosure. The scope of the present disclosure is subject to the attached claims.

The invention claimed is:

1. An explosion-proof enclosure for an energy storage device, comprising:
   a housing body, having a through hole; and
   an explosion-proof element, comprising a central portion and a pressure relief portion provided around the central portion, wherein the pressure relief portion is loop-shaped, the pressure relief portion is provided in the through hole and is in sealed connection with the through hole, the pressure relief portion is configured to crack and split from the housing body in response to deformation of the housing body when a pressure intensity in the housing body reaches a first set value, and to detach from the housing body when the pressure intensity reaches a second set value greater than the first set value,
   wherein the housing body outwardly extends at the through hole to form a cylindrical body,
   wherein a portion of the cylindrical body connected to the housing body defines—a root portion, an outer chamfer is formed on the outer side of the root portion of the cylindrical body, and an inner chamfer is formed on the inner side of the root portion of the cylindrical body, and
   wherein the pressure relief portion is located inside the cylindrical body, the pressure relief portion includes a straight section and a curved section, a first sealing connection is formed between the straight section and the cylindrical body, a second sealing connection is formed between the straight section and the central portion, and the curved section is located in a region confined by the inner chamfer.

2. The explosion-proof enclosure according to claim 1, wherein the housing body and the central portion are made of conductors, and the housing body and the central portion serve as two electrodes of an energy storage device respectively.

3. The explosion-proof enclosure according to claim 1, wherein the size of the pressure relief portion along a radial direction is defined as a width, the size along an axial direction is defined as a height, wherein a ratio of the width to the height is greater than or equal to 0.5.

4. The explosion-proof enclosure according to claim 1, wherein the pressure relief portion is ring-shaped, the size of the pressure relief portion along an axial direction is defined as a height, and a ratio of the diameter of an outer ring to the height of the pressure relief portion is greater than or equal to 1.

5. The explosion-proof enclosure according to claim 1, wherein the pressure relief portion has a rectangular loop shape, the size of the pressure relief portion along an axial direction is defined as a height, and a ratio of the length of a diagonal line to the height of the pressure relief portion is greater than or equal to 1.

6. The explosion-proof enclosure according to claim 1, wherein the pressure relief portion has an elliptical loop shape, the size of the pressure relief portion along an axial direction is defined as a height, and a ratio of the size of a long axis to the height of the pressure relief portion is greater than or equal to 1.

7. The explosion-proof enclosure according to claim 1, wherein the pressure relief portion is filled in a region confined by the inner chamfer.

8. The explosion-proof enclosure according to claim 1, wherein the housing body comprises a top portion and a bottom portion, and a cover plate is located on the top portion of the housing body, and the through hole is provided in the cover plate.

9. The explosion-proof enclosure according to claim 8, wherein a thickness of the cover plate is 0.1 mm to 1 mm.

10. The explosion-proof enclosure according to claim 8, wherein the housing body forms a cavity, wherein the cover plate comprises an inner surface close to the cavity and an outer surface opposite to the inner surface, both the inner surface and the outer surface are planes; and wherein the explosion-proof element comprises a lower end surface close to the cavity and an upper end surface opposite to the lower end surface, wherein the lower end surface is level with the inner surface, and the upper end surface is level with the outer surface.

11. The explosion-proof enclosure according to claim 1, wherein the size of the pressure relief portion along a radial direction is defined as a width, the size along an axial direction is defined as a height, wherein the width is 0.1 mm to 5 mm, and the height is 0.2 mm to 5 mm.

12. The explosion-proof enclosure according to claim 1, wherein the housing body comprises a top portion and a bottom portion, wherein a cover plate is provided on the top portion of the housing body, wherein the cover plate comprises an inner surface close to a cavity formed by the housing body and an outer surface opposite to the inner surface, wherein the central portion comprises a first end surface close to the cavity and a second end surface opposite to the first end surface, wherein the first end surface and/or the second end surface extends radially to form an extension, and the extension at least partially covers an inner surface and/or an outer surface of the pressure relief portion, wherein the inner surface of the pressure relief portion is close to the cavity and the outer surface of the pressure relief portion is opposite to the inner surface.

13. The explosion-proof enclosure according to claim 1, wherein a surface of the housing body is recessed to form a strip-shaped groove, wherein an extension line of the groove passes through the explosion-proof element.

14. The explosion-proof enclosure according to claim 13, wherein a plurality of the grooves is provided, and the plurality of the grooves is radial with the center of the explosion-proof element as a center.

15. The explosion-proof enclosure according to claim 1, wherein the pressure relief portion is made of an inorganic nonmetal material.

16. The explosion-proof enclosure according to claim 1, wherein the material of the pressure relief portion is glass or ceramic.

17. The explosion-proof enclosure according to claim 1, wherein the coefficient of thermal expansion of the central portion is equal to the coefficient of thermal expansion of the pressure relief portion, and the coefficient of thermal expansion of the housing body is greater than or equal to the coefficient of thermal expansion of the pressure relief portion.

18. An energy storage device, comprising an energy conversion element and the explosion-proof enclosure according to claim 1.

19. The explosion proof enclosure according to claim 12, the extension integrally covers the inner surface and/or the outer surface of the pressure relief portion.

* * * * *